United States Patent [19]

Chaboseau

[11] Patent Number: 4,775,772
[45] Date of Patent: Oct. 4, 1988

[54] HINGED CORE DEVICE FOR RUNNING INDUCTIVE HEATING

[75] Inventor: Jean Chaboseau, Boissy Saint Leger, France

[73] Assignee: Alsthom, Paris Cedex, France

[21] Appl. No.: 6,032

[22] Filed: Jan. 22, 1987

[30] Foreign Application Priority Data

Jan. 21, 1986 [FR] France .................. 86 00775

[51] Int. Cl.⁴ .............................. H05B 6/10
[52] U.S. Cl. .................. 219/10.61 R; 219/10.43; 219/10.71; 219/10.75; 219/10.79
[58] Field of Search .......... 219/10.61 R, 10.57, 219/10.79, 10.67, 10.43, 10.75, 10.71, 10.69

[56] References Cited

U.S. PATENT DOCUMENTS

| | | |
|---|---|---|
| 1,383,963 | 7/1921 | Mordey . |
| 1,996,502 | 4/1935 | Brown . |
| 2,293,049 | 8/1942 | Denneen et al. ............ 219/10.75 X |
| 2,448,062 | 8/1948 | Stoltz ................. 219/10.71 |
| 3,313,907 | 4/1967 | Geisel ................ 219/10.61 R |
| 3,692,969 | 9/1972 | Kasper .................. 219/10.57 |
| 4,311,896 | 1/1982 | Junya .................. 219/10.79 X |

FOREIGN PATENT DOCUMENTS 2169964 9/1973 France .
2466306 4/1981 France .

Primary Examiner—Philip H. Leung
Attorney, Agent, or Firm—Sughrue, Mion, Zinn, Macpeak, and Seas

[57] ABSTRACT

The invention relates to a hinged core device for running inductive heating. A sheet (1) runs at high speed along a longitudinal direction (V) perpendicular to the plane of the figure. It passes through a gap (E) in a magnetic circuit (2B, 2D, 2A, 2C) which is excited by coils (3). In order to prevent damage on the arrival of a defect projecting from said sheet solely rock about a transverse axis (11) apart from all other core lengths of the magnetic circuit.

9 Claims, 5 Drawing Sheets

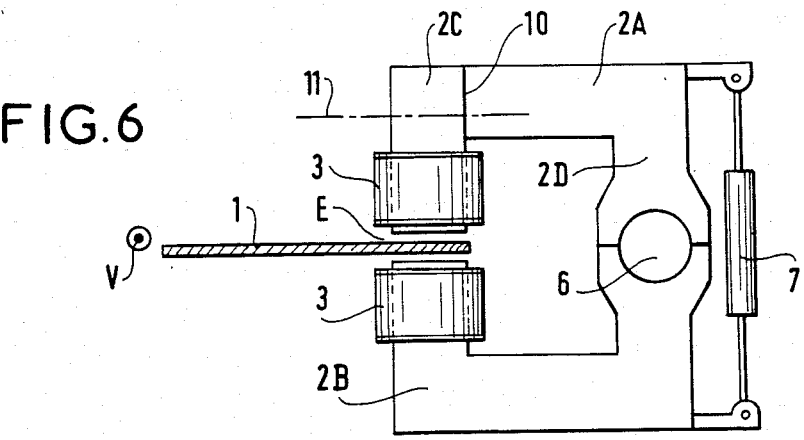
FIG.6
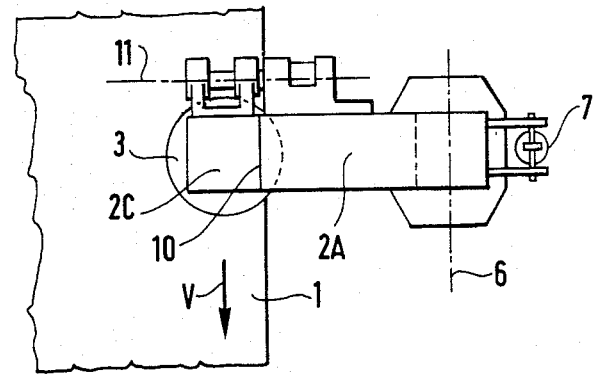
FIG.7
FIG.8
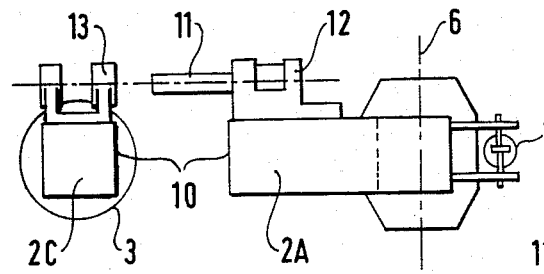
FIG.9
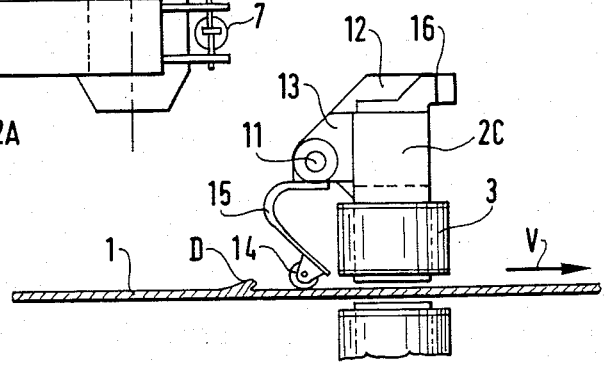

HINGED CORE DEVICE FOR RUNNING INDUCTIVE HEATING

FIELD OF THE INVENTION

The invention relates to heating fast-moving electrically-conductive products by electromagnetic induction. It relates, in particular, to heating metal sheets, and more particularly to heating the edges of "margins" thereof.

BACKGROUND OF THE INVENTION

A device performing such heating is sometimes called a "heater" and comprises a laminated iron magnetic circuit called the "core" which is provided with an excitation coil in order to constitute an inductor. This core may be built up from two (or more) elements or it may be constituted by a single element; FIGS. 1 to 5 show such prior art devices.

FIG. 1 is a perspective view of a first or "U-type" prior art device. It is placed at the edge of the sheet to be treated. Here, and below, reference 1 designates horizontal sheet running in the direction of arrow "V", and reference 1R designates the width of the margin to be heated.

The magnetic core of the heater comprises two half-cores: one half 52A above the sheet and another 52B below the sheet; and reference 53 designates the induction coil mounted on half-core 52A.

By virtue of these two half-cores guiding the magnetic flux created by said coil, the flux passes through the sheet across an air gap and thus induces electrical current therein which heats the sheet.

FIG. 2 is a perspective view of a second of "C-type" prior art device in which the core is referenced 52 and the induction coil 53A.

In all cases the size of the air gap must be minimized in order to maximize device efficiency. However, the value of the gap cannot be reduced to less than a limit which is defined by the greatest thickness of the thickest sheet to be treated plus a safety margin which is not less than the maximum expected vertical amplitude of flatness defects which may constitute projections from the sheet.

The "C-type" device is advantageous since it appears in practice that the flux loop can be closed with a single air gap, rather than with the two air gaps generally required for a "U-type" device.

In addition, a C-type device is suitable for an improvement which is described in French Pat. No. 85/08684 and which enables the size of the gap to be reduced: this improvement consists in hingeing the magnetic core about an axis which extends parallel to the direction of sheet movement, as shown in FIG. 3 which is an end view of a third prior art device. This figure shows two half-cores 52C and 52D excited by coils 53C and hinged about an axis 56 which is perpendicular to the plane of the figure, i.e. parallel to the direction of movement of the sheet 1. The size of the gap can be adjusted by means of an actuator 57, whereby enabling the size of the gap to be matched to different thickness of sheet to be treated. The safety margin can thus be reduced by controlling the length of the actuator using detectors which sense the tops of defects and which transmit appropriate instructions to the actuator. However, this last-mentioned possibility is not used for fear of the consequences of a failure in the detection system, which would be catastrophic for the heater device.

Persons skilled in the art nevertheless accept that heater safety is ensured if the heater can withdraw or retract readily under direct impact from a defect in the sheet.

The problem then arises of finding a disposition which enables such retraction to occur without suffering from damaging forces during impact. In practice, advantage may be drawn from the fact that defects in metal sheet give rise to dangerous projections in the upwards direction only.

A known solution in a fourth heater device of the U-type consists in providing a moving half-core 52E with a protective slope 58 (see FIG. 4 which is a partial side view) and in suspending said half-core, together with its excitation winding 53E from the end of a rocker arm 56A (see FIG. 5 which is an end view with the slope and the coil removed). This arm is supported by a shaft 56B and is provided with a counterweight 59 which is intended to minimize the force required for lifting the half-core 52E.

Such a solution using a counterweight is clearly also applicable to a C-type heater using the hinged core as shown in FIG. 3.

In practice, devices using this solution have been severely damaged by defects projecting vertically from metal sheet running at high speed.

The aim of the present invention is to reduce in simple manner the forces which need to be applied to the core of a heater device on impact between said core and a defect in the running metal sheet.

SUMMARY OF THE INVENTION

The present invention provides a hinged core device for running inductive heating, said device being intended to heat a long product (1) running substantially horizontally from back to front along its longitudinal direction (V) and having a width extending in a substantially horizontal transverse direction and a thickness extending in a substantially vertical direction;

said device comprising at least one excitation coil (3) for setting up an alternating magnetic field for heating purposes; and a ferromagnetic core (2A, 2B, 2C, 2D) constituting a magnetic circuit which guides said field to an air gap through which the product runs in order to be heated by said field;

said core being formed in a plurality of lengths, at least one of which can be lowered vertically down to said air gap and constitutes a heater head (2C) above said product to be heated (1), in such a manner that a defect (D) projecting upwardly from said product could strike said heater head and damage the device;

a portion of said core being hinged to rotate about a nonvertical safety hinge axis in order to lift said heater head urgently before the device is damaged by said projecting defect;

said device being characterized by the fact that said heater head (2C) is movable relative to the remainder of said core (2A, 2D, 2B) by being hinged about said safety hinge axis (11) in such a manner that the mass to be moved in order to lift said head urgently has a low moment of inertia for rotation about said axis.

The present inventor has discovered that under normal operating conditions of the fourth above-mentioned prior art device, the forces most likely to be dangerous appear during "contact" between the device and a defect in the running sheet constituted by a sharp projection, and that said forces are then essentially related to the overall inertia of the items connected to the rocker arm: since the sheet runs at constant speed, "making contact" with any defect results in a "shock". As a result, although installing a counterweight improves the static equilibrium of the rocker arm, it also increases its inertia under "dynamic" situations and these are the most dangerous situations.

In accordance with the present invention, the heater head is mechanically dissociated from the remainder of the magnetic circuit so that the mass to be retracted in the event of contact being made with a defect is reduced to the minimum possible, i.e. to that portion of the device which is situated above the running sheet.

Preferably, in accordance with the invention, said safety hinge axis (11) is oriented along said transverse direction, and the length (2A) of said core in contact with said heater head (2C) extends along said transverse direction in the same transverse vertical plane as said head up to a plane end face (10) perpendicular to said direction;

said head having a plane side face (10) perpendicular to said transverse direction and substantially in contact with said end face of said length in contact, so that rotation of said head about said safety hinge axis is made possible while setting up only a small gap in said magnetic circuit.

In accordance with a first and a second implementation of the invention, respectively applicable to a C-type device and to a U-type device, the top portion of said heater head (2C) and said length in contact therewith (2A) have hinge members (12, 13) to one side constituting said safety hinge axis (11) in the proximity of said length, substantially in the horizontal plane thereof and ahead thereof so as to avoid locally reducing the useful magnetic cross-section of said core and so that the longitudinal thrust from said projecting defect (D) against the bottom portion of said head raises said portion.

In accordance with a third implementation of the invention, said safety hinge axis (111) is disposed at a distance behind said heater head (102C);

said head carrying a sliding slope (117) at a distance ahead which rises obliquely and forwardly in such a manner that such a projecting defect (D) moving towards the device encounters said slope first, and then slides longitudinally under said slope, thereby lifting the slope and simultaneously lifting said head by rotation about said hinge axis.

Depending on circumstances, and preferably, the following dispositions are also adopted:

said heater head (2C, 22C, 102C) carries a wheel (14, 34, 114) disposed in such a manner as to press against said projecting defect (D) in order to avoid friction against said defect;

said head (2C, 22C, 102C) carries a resilient damping member (15, 35, 115) disposed in such a manner as to bend under the shock from said projecting defect (D) in order to damp said shock; and said head (2C, 102C) is provided with an abutment (16, 116) defining its normal operating position without preventing it from being raised on the arrival of said projecting defect (D).

Implementations of the invention are described below in greater detail by way of non-limiting example and with reference to the accompanying diagrammatic figures. It must be understood that the elements described may be replaced by other elements providing the said technical functions. When the same element is shown in several of the figures, it is designated by the same reference symbol in all of them.

Wherever one of these reference symbols is used above in parentheses, it is used by way of non-limiting example and by way of reference to the same figures.

BRIEF DESCRIPTION OF THE FIGURES

It is recalled that FIGS. 1 and 2 are perspective views of first and second prior art devices of the U-type and of the C-type;

that FIG. 3 is an end view of a third prior art device which is hinged and of the C-type; and that FIGS. 4 and 5 are a fragmentary side view and end view of a fourth prior art device of the U-type which is hinged and includes a counterweight.

FIGS. 6 and 7 are an end view and a top view of a first device in accordance with said first implementation of the present invention.

FIG. 8 is a top view of the same device after the heater head has been separated therefrom.

FIG. 9 is a fragmentary side view of the same device.

DESCRIPTION OF PREFERRED EMBODIMENTS

Figure 1:
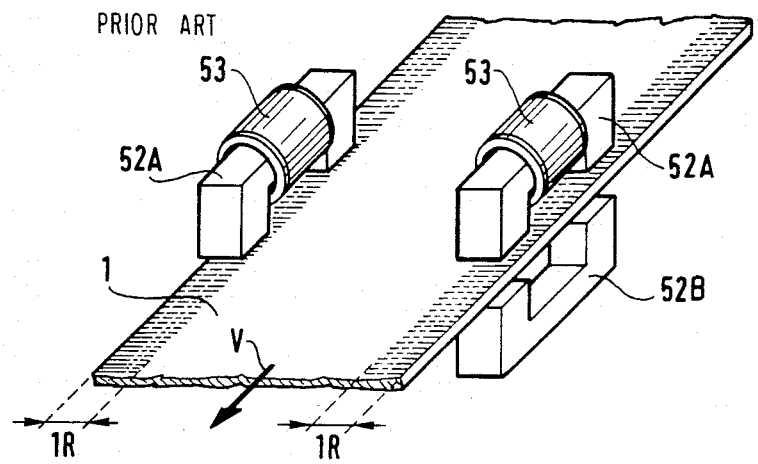
Figure 2:
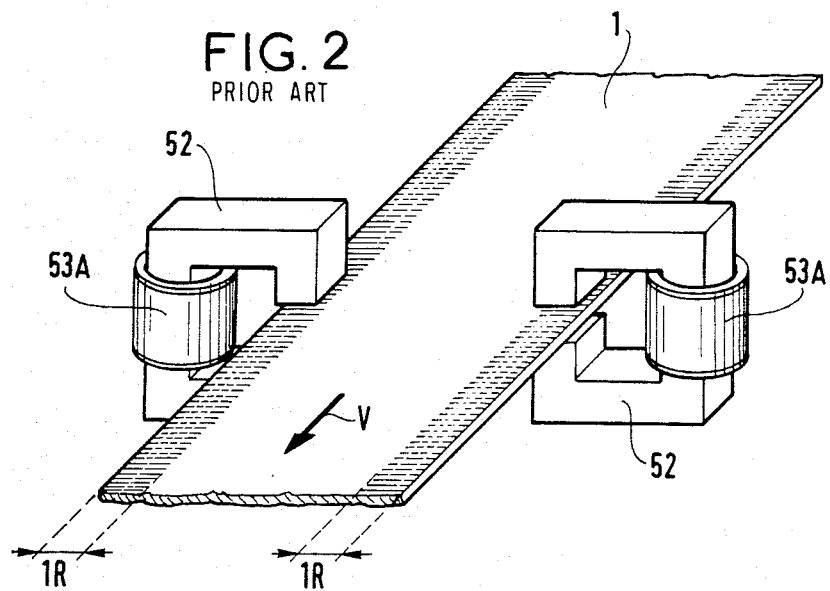
Figure 3:
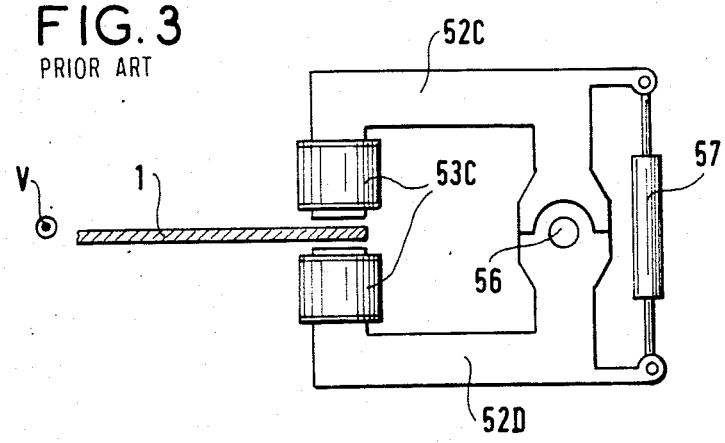

These four devices have the dispositions mentioned above as being preferable in accordance with the invention. The flat product to be heated is a metal sheet 1 running in the direction indicated by arrow V.

The first device in accordance with the invention is a C-type heater made in accordance with the invention.

The core is made of three mechanically-distinct elements. One element comprises two lengths 2A and 2D together with another element constituted by a heater head 2C and constitutes a top half-core.

An element 2B constitutes a fixed bottom half-core. The element 2C is separated from the element 2A, 2D by a plane sliding interface referenced 10 and extending perpendicularly to the sheet and parallel to its running speed. This element is capable of rotating about a shaft 11 which constitutes said safety hinge axis and which is likewise parallel to the sheet, but extends perpendicularly to its running speed. As a result, the element 2C is fixed to the element 2A, i.e. it follows the movements thereof exactly when the element 2A rotates about a longitudinal adjustment hinge axis 6 under the action of an actuator 7 in order to adjust the width of the gap E.

FIG. 8 is a top view with the elements 2A and 2C separated. It can be seen that the length 2A has a side structure 12 which holds the shaft 11. The head 2C carries a structure 13 constituting bearings enabling it to be threaded over the shaft 11 so as to be rotatable thereabout.

FIG. 7 shows the elements 2A, 2D, and 2C assembled.

A member can be seen for making contact with sheet defects. This member is constituted in this case in the form of a wheel 14 which is fixed to the structure 13 by means of a resilient link 15, FIG. 9, constituting said damping member and constituted, for example, by a blade spring whose shape is adapted to various types of sheet defect in order to reduce the shock forces. In the event of impact with a defect D, the wheel 14 rotates the head 2C about the axis 11, with the interface 10 sliding in its own plane. The element 2C follows the movement of the wheel 14 (with allowance for deformation of the blade 15). An abutment 16 is provided to prevent the head from rocking on the return movement.

An advantage of the device is that it is relatively insensitive to the electromagnetic forces exerted on the head 2C. For small-amplitude defects, this is because the retraction movement is substantially parallel to the force, whereas for large-amplitude defects this is because the cross-section offered to the passage of magnetic flux at 10 is reduced as 2C rotates about the axis 11, thereby reducing the force.

Modifications can obviously be made to this device without going beyond the scope of the invention. For example, a resilient return bar may be integrated between the structures 12 and 13 via the shaft 11, or some other form of contact-making member may be used.

The excitation coils are referenced 3.

Figure 10:
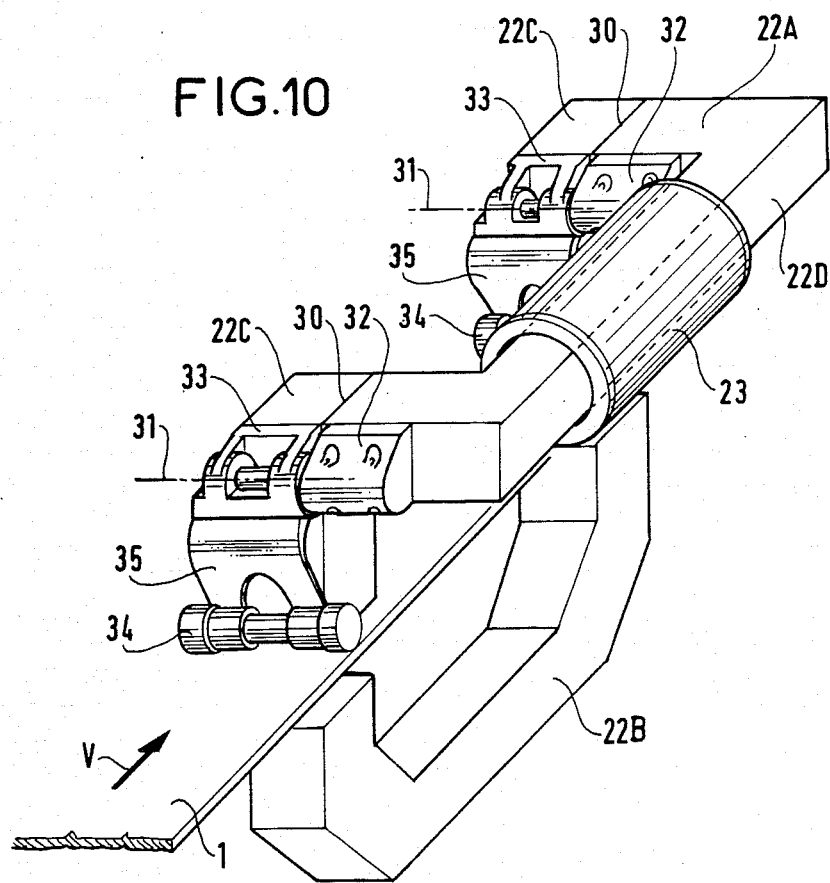
FIG. 10 is a perspective view of a second device in accordance with said second implementation of the invention.

The invention is applicable to U-type heaters such as the second device as shown in FIG. 10. In this case, there are two sliding interfaces 30 per heater, and each of them is formed at the end of a transverse length 22A. This transverse length constitutes a length mentioned above as being in contact with the heater head, and it is oriented at 90° to a longitudinal length 22D which carries the excitation coil 23 and which has such a length 22A at each of its two ends. Similarly, there are two heater heads 22C which follow one another in the longitudinal direction. These elements of this second device have reference numerals related to the reference numerals of analogous elements on the first device by adding 20 thereto.

Figure 11:
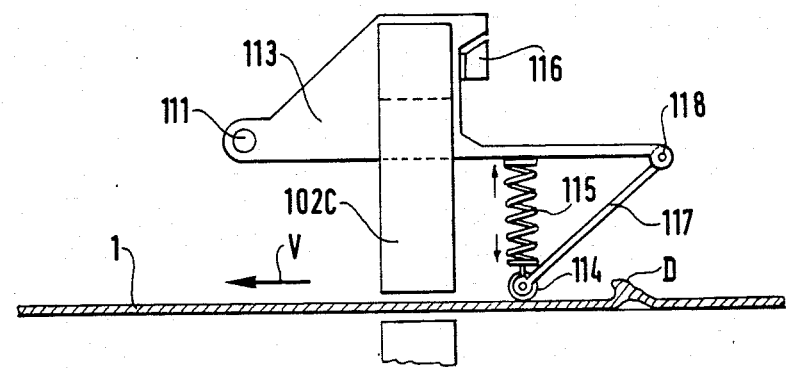
FIGS. 11 and 12 are fragmentary side views of third and fourth devices in accordance with said third and fourth implementations of the invention.

In the third device in accordance with the invention and shown in FIG. 11, a side slope 117 is mounted to slope forwardly and is capable of oscillating about a transverse axis 118 under the effect of a shock from a defect D and is returned by a damping spring 15.

Said axis 118, said spring, and the safety hinge axis are all carried by the heater head 102C, with the axis 118 and the spring being ahead of the heater had 102C and the safety hinge axis being behind it.

The elements of this third device have reference numerals related to analogous elements of the first device in accordance with the invention by adding 100 thereto.

Figure 12:
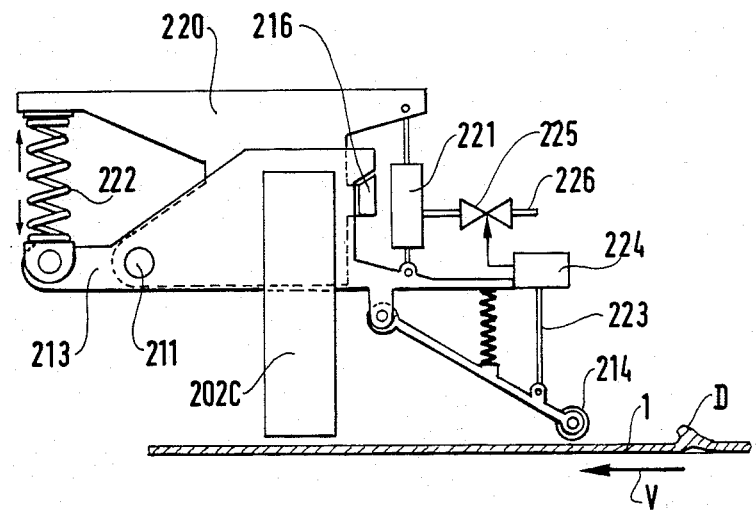

The advantages of the present invention also appear when heater head retraction is to be controlled not by direct impact of a sheet defect against a part which transmits said impact to said head, but rather by means of a prestressed system which is triggered by the impact of a defect on said device, i.e. without requiring a control chain, and causing the head to be raised instantaneously by using energy which has previously been stored for the purpose. One such system, known per se is incorporated in a fourth implementation shown in FIG. 12. As shown in this figure, a fixed support 220 serves as a thrust point for an actuator 221 and for a spring 222, both of which thrust in rotary near-equilibrium against a part 213 which is fixed to the heater head 202C. The heater head is held in its working position against an abutment 216 by the slightly stronger action of the actuator 221. In the event of a defect striking a wheel 214, a feeler 223 operates a trigger 224 causing the actuator to be emptied via a valve 225 and an exhaust duct 226. The thrust from the spring 222 then raises the head by pivoting it about the safety hinge axis 211.

Figure 4:
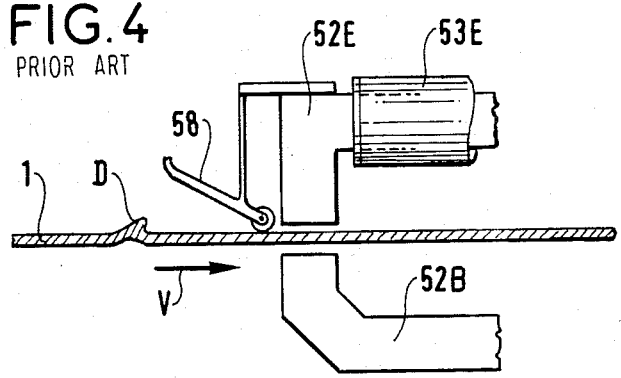
Figure 5:
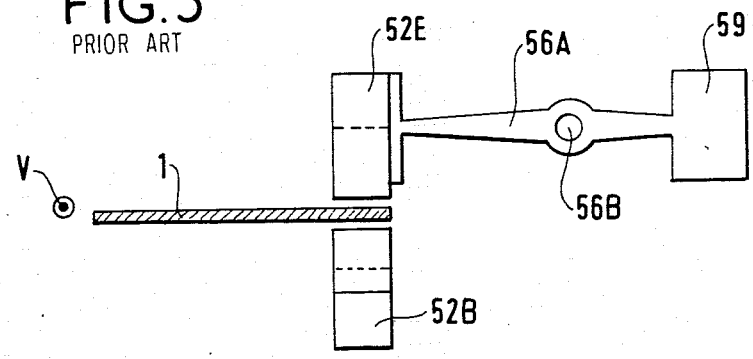

Such a system would be very expensive if the moving part to be raised had large inertia like the top arm of the core shown at C in FIG. 4. It is much easier to make such a system when it is applied to a hinged heater head in accordance with the invention.

It thus appears, more generally, that in accordance with this fourth implementation of the invention, the heater device comprises a prestressed safety operating system 221, 222 including means 222 for prior storage of operating energy and trigger means 214, 224, 225, and 221 which are themselves suitable for being directly triggered by the arrival of such a projecting defect D in order to trigger the use of said operating energy in order to raise said heater head 202C urgently by rotation about said safety hinge axis 211.

I claim:
1. In an improved hinged core device for inductive heating,
    said device having a horizontal longitudinal direction extending from upside to downside of said device, and an horizontal transverse direction, for running a horizontal long product to be heated along said longitudinal direction from upside to downside;
    said device comprising at least one excitation coil for setting up an alternating magnetic field for heating purposes; and
    a ferromagnetic core constituting a magnetic circuit having an air gap which guides said field to said air gap through which the product to be heated runs in order to be heated by said field;
    said core being formed by a plurality of substantially rectilinear core lengths, at least one of which extends vertically down to said air gap and constitutes a heater head above said product to be heated, whereby a defect projecting upwardly from said product could strike said heater head and damage said device;
    a safety movable portion of said core comprising said heater head and means for hinging said heater head for rotation about a non-vertical safety hinge axis in order to allow to lift said heater head before the device is damaged by said projecting defect;
    the improvement comprising means for hinging said heater head relative to the remainder of said ferromagnetic core about said safety hinge axis so as to solely constitute said safety movable portion apart from the other of said core lengths, whereby said safety movable portion heating head has a low moment of inertia for rotation about said safety hinge axis.

2. A device according to claim 1, wherein said means for hinging said heater head defining a safety hinge axis oriented along said transverse direction.

3. A device according to claim 2, wherein said core including a core length adjacent to said heater head which extends along said transverse direction in a same transverse vertical plane as said heater head up to a plane end face perpendicular to said transverse direction;
    said heater head having a plane side face perpendicular to said transverse direction and substantially in contact with said end face of said adjacent core length, so that rotation of said heater head about said safety hinge axis is effected while setting up only a small gap in said magnetic circuit.

4. A device according to claim 3, wherein said heater head includes a top portion and the top portion of said heater head and said adjacent core length bear hinge members to one side thereof defining said safety hinge axis substantially in the horizontal plane thereof and upside of them in terms of said product running direction such that there is no local reduction of the useful magnetic crosssection of said core and whereby the longitudinal thrust from said projecting defect against the bottom portion of said heater head raises said heater head.

5. A device according to claim 3, wherein said safety hinge axis is disposed at a distance downside of said heater head; and said heater head carries a sliding slope at a distance upside of said heater head which slope rises obliquely downside whereby a projecting defect moving towards the device encounters said slope first, and then slides longitudinally under said slope, thereby lifting the slope and simultaneously lifting said heater head by rotation about said safety hinge axis.

6. A device according to claim 3, further including a prestressed safety operating system including means operatively coupled to said heater head for prior storage of operating energy and trigger means operatively coupled to said storage means and directly triggered by the arrival of such a projecting defect in order to trigger the use of said operating energy so as to raise said heater head urgently by rotation about said safety hinge axis.

7. A device according to claim 1, wherein said heater head carries a wheel disposed in such a manner as to press against said defect.

8. A device according to claim 1, wherein said heater head carries a resilient damping member disposed in such a manner as to bend under the shock from said projecting defect in order to damp said shock.

9. A device according to claim 1, wherein said heater head is provided with an abutment defining its normal operating position without preventing it from being raised on the arrival of said projecting defect.

* * * * *